(12) United States Patent
Yim et al.

(10) Patent No.: US 9,622,022 B2
(45) Date of Patent: Apr. 11, 2017

(54) MASTER IMS TERMINAL FOR SHARING IMS-BASED SERVICE, SLAVE IMS TERMINAL FOR SHARING IMS-BASED SERVICE, SYSTEM FOR SHARING IMS-BASED SERVICE, AND SHARING METHOD

(71) Applicant: Electronics and Telecommunications Research Institute, Daejeon (KR)

(72) Inventors: Jong Choul Yim, Daejeon (KR); Hyun Joo Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/800,219

(22) Filed: Jul. 15, 2015

(65) Prior Publication Data
US 2016/0021489 A1 Jan. 21, 2016

(30) Foreign Application Priority Data
Jul. 16, 2014 (KR) .................. 10-2014-0089537

(51) Int. Cl.
*H04W 4/00* (2009.01)
*H04L 29/06* (2006.01)
*H04L 29/08* (2006.01)

(52) U.S. Cl.
CPC ......... *H04W 4/008* (2013.01); *H04L 65/1016* (2013.01); *H04L 67/104* (2013.01)

(58) Field of Classification Search
CPC ... H04W 4/008; H04L 65/1016; H04L 67/104
USPC ....................................................... 455/41.1
See application file for complete search history.

(56) References Cited

U.S. PATENT DOCUMENTS

| | | | | |
|---|---|---|---|---|
| 5,887,243 A * | 3/1999 | Harvey | .................. | G01R 1/071 348/E5.108 |
| 6,788,676 B2 * | 9/2004 | Partanen | ............. | H04L 12/5695 370/352 |
| 7,389,426 B2 * | 6/2008 | Bumiller | ............... | H04L 63/123 380/270 |
| 7,463,882 B2 * | 12/2008 | Tuomela | .............. | H04Q 3/0016 455/41.2 |
| 7,536,184 B2 * | 5/2009 | Poczo | ..................... | H04W 8/18 455/432.3 |
| 7,561,535 B2 * | 7/2009 | Naqvi | .................. | H04M 7/006 370/260 |
| 7,672,297 B2 * | 3/2010 | Naqvi | ................. | H04L 12/2801 370/352 |

(Continued)

FOREIGN PATENT DOCUMENTS

| | | |
|---|---|---|
| KR | 1020130022846 A | 3/2013 |
| KR | 1020130104357 A | 9/2013 |
| KR | 1020130127158 A | 11/2013 |

*Primary Examiner* — Hai V Nguyen
(74) *Attorney, Agent, or Firm* — William Park & Associates Ltd.

(57) ABSTRACT

An IP multimedia subsystem (IMS)-based service sharing system includes an IMS, a master IMS terminal registered in the IMS, and a slave IMS terminal not registered in the IMS, wherein the master IMS terminal transmits IMS registration information to the slave IMS terminal by using near field communication (NFC), and the slave IMS terminal is registered in the IMS on the basis of the transmitted IMS registration information.

19 Claims, 13 Drawing Sheets

(56) References Cited

U.S. PATENT DOCUMENTS

| | | | | |
|---|---|---|---|---|
| 7,725,734 B2* | 5/2010 | Bumiller | H04L 63/123 | 380/270 |
| 7,743,151 B2* | 6/2010 | Vallapureddy | A61B 5/0031 | 128/903 |
| 7,783,771 B2* | 8/2010 | Pantalone | H04L 12/2809 | 370/351 |
| 7,792,528 B2* | 9/2010 | Naqvi | H04M 7/123 | 370/389 |
| 8,072,934 B2* | 12/2011 | Vikberg | H04W 28/18 | 370/329 |
| 8,112,523 B2* | 2/2012 | Van Elburg | H04L 29/12594 | 370/352 |
| 8,181,030 B2* | 5/2012 | Lee | H04L 9/321 | 455/410 |
| 8,223,717 B2* | 7/2012 | Dillon | H04L 29/12188 | 370/331 |
| 8,472,376 B2* | 6/2013 | Przybysz | H04L 65/1016 | 370/328 |
| 8,527,759 B2* | 9/2013 | Murakami | H04L 63/061 | 380/278 |
| 8,554,882 B2* | 10/2013 | Belinchon Vergara | G06F 21/6218 | 370/254 |
| 8,621,656 B2* | 12/2013 | Miettinen | G06F 21/31 | 726/1 |
| 8,886,164 B2* | 11/2014 | Palanigounder | H04L 63/0823 | 370/312 |
| 8,898,793 B2* | 11/2014 | Miettinen | G06F 21/31 | 380/258 |
| 8,984,615 B2* | 3/2015 | Bhuyan | H04L 63/061 | 719/311 |
| 9,094,412 B2* | 7/2015 | Dutta | H04L 41/0677 | |
| 9,178,979 B1* | 11/2015 | Khalil | H04M 3/42 | |
| 9,246,924 B2* | 1/2016 | Sukumaran | G06Q 10/10 | |
| 9,332,000 B2* | 5/2016 | Lei | H04L 63/0815 | |
| 2003/0154400 A1* | 8/2003 | Pirttimaa | H04L 29/06 | 726/14 |
| 2004/0043776 A1* | 3/2004 | Tuomela | H04Q 3/0016 | 455/456.3 |
| 2004/0085949 A1* | 5/2004 | Partanen | H04L 12/5695 | 370/352 |
| 2006/0268835 A1* | 11/2006 | Hyotylainen | H04L 67/14 | 370/352 |
| 2006/0276137 A1* | 12/2006 | Pummill | H04W 92/14 | 455/67.11 |
| 2007/0043947 A1* | 2/2007 | Mizikovsky | H04L 63/0869 | 713/172 |
| 2007/0072605 A1* | 3/2007 | Poczo | H04L 67/30 | 455/432.2 |
| 2007/0094691 A1* | 4/2007 | Gazdzinski | H04N 7/17318 | 725/62 |
| 2007/0121584 A1* | 5/2007 | Qiu | H04M 3/42042 | 370/352 |
| 2007/0124818 A1* | 5/2007 | Bumiller | H04L 63/123 | 726/26 |
| 2007/0143489 A1* | 6/2007 | Pantalone | H04L 12/2809 | 709/230 |
| 2007/0159976 A1* | 7/2007 | Dekeyzer | H04L 12/2856 | 370/236 |
| 2007/0162605 A1* | 7/2007 | Chalasani | H04L 12/581 | 709/227 |
| 2007/0234048 A1* | 10/2007 | Ziv | H04M 3/56 | 713/159 |
| 2007/0250709 A1* | 10/2007 | Bailey, Jr. | H04L 63/0428 | 713/168 |
| 2008/0133757 A1* | 6/2008 | Etelapera | H04M 3/58 | 709/227 |
| 2008/0177889 A1* | 7/2008 | Beyer | H04L 65/1016 | 709/230 |
| 2008/0208921 A1* | 8/2008 | Bumiller | H04W 12/10 | |
| 2008/0227451 A1* | 9/2008 | Fukui | H04W 8/12 | 455/435.1 |
| 2008/0305794 A1* | 12/2008 | Mukaiyama | H04L 65/1046 | 455/435.1 |
| 2009/0023435 A1* | 1/2009 | Kuivalainen | H04L 29/06 | 455/419 |
| 2009/0067417 A1* | 3/2009 | Kalavade | H04L 12/66 | 370/356 |
| 2009/0109903 A1* | 4/2009 | Vikberg | H04W 28/18 | 370/329 |
| 2009/0157799 A1* | 6/2009 | Sukumaran | G06Q 10/10 | 709/203 |
| 2009/0172397 A1* | 7/2009 | Kim | H04L 63/0853 | 713/168 |
| 2009/0307307 A1* | 12/2009 | Igarashi | H04N 7/17309 | 709/203 |
| 2009/0320077 A1* | 12/2009 | Gazdzinski | H04N 7/17318 | 725/62 |
| 2009/0323636 A1* | 12/2009 | Dillon | H04L 29/12188 | 370/331 |
| 2010/0011128 A1* | 1/2010 | Paycher | G06F 13/102 | 710/1 |
| 2010/0030904 A1* | 2/2010 | Oda | H04L 65/1016 | 709/228 |
| 2010/0111025 A1* | 5/2010 | Parlamas | H04W 76/022 | 370/329 |
| 2010/0130171 A1* | 5/2010 | Palanigounder | H04L 63/0823 | 455/411 |
| 2010/0135487 A1* | 6/2010 | Lee | H04L 9/321 | 380/46 |
| 2010/0182985 A1* | 7/2010 | Guenther | H04L 29/12188 | 370/338 |
| 2010/0232402 A1* | 9/2010 | Przybysz | H04L 65/1016 | 370/338 |
| 2010/0263032 A1* | 10/2010 | Bhuyan | H04L 63/061 | 726/7 |
| 2010/0312897 A1* | 12/2010 | Allen | H04L 12/1822 | 709/227 |
| 2011/0004754 A1* | 1/2011 | Walker | H04L 9/3271 | 713/168 |
| 2011/0055565 A1* | 3/2011 | Murakami | H04L 63/061 | 713/168 |
| 2011/0107379 A1* | 5/2011 | Lajoie | H04L 65/4076 | 725/87 |
| 2011/0110223 A1* | 5/2011 | Dutta | H04L 41/0677 | 370/221 |
| 2011/0119359 A1* | 5/2011 | Belinchon Vergara | G06F 21/6218 | 709/220 |
| 2011/0194459 A1* | 8/2011 | Belinchon Vergara | H04L 29/12188 | 370/254 |
| 2011/0211527 A1* | 9/2011 | Agarwal | H04L 61/1588 | 370/328 |
| 2012/0011559 A1* | 1/2012 | Miettinen | G06F 21/31 | 726/1 |
| 2012/0016989 A1* | 1/2012 | Fuller | H04L 12/00 | 709/225 |
| 2012/0042084 A1* | 2/2012 | Dutta | H04L 65/1016 | 709/228 |
| 2012/0115542 A1* | 5/2012 | Griffin | H04W 8/205 | 455/552.1 |
| 2012/0185910 A1* | 7/2012 | Miettinen | G06F 21/31 | 726/1 |
| 2012/0227084 A1* | 9/2012 | Shen | H04L 65/1073 | 726/2 |
| 2012/0233327 A1* | 9/2012 | Smith | H04L 65/1006 | 709/225 |
| 2012/0315897 A1* | 12/2012 | Griffin | H04W 8/205 | 455/426.1 |
| 2013/0060954 A1* | 3/2013 | Dahlqvist | H04L 65/1006 | 709/228 |
| 2013/0148585 A1* | 6/2013 | Ohlsson | H04L 61/3095 | 370/328 |
| 2013/0308632 A1* | 11/2013 | Keller | H04W 76/02 | 370/352 |

(56) References Cited

U.S. PATENT DOCUMENTS

| | | | |
|---|---|---|---|
| 2015/0245374 A1* | 8/2015 | Mitola, III | G06Q 30/08 370/329 |
| 2015/0334135 A1* | 11/2015 | Le Rouzic | H04L 65/1016 455/445 |
| 2016/0119386 A1* | 4/2016 | Le Rouzic | H04L 65/104 709/229 |

* cited by examiner

FIG. 4

IMPI (313a)
IMPU (313b)
Home Network Domain Name (313c)
P-CSCF Address (313d)
Registration Owner (313e)

FIG. 5

```
REGISTER sip:registrar.home1.net SIP/2.0
Via: SIP/2.0/UDP[1111::aaa:bbb:ccc:ddd]:comp=sigcomp;branch=z0hG4bknashds7
Max-Forwards:70
From: <sip:master_public1@home1.net>                                          (501)
To: <sip:master_public1@home1.net>                                            (502)
Contact: <sip:[1111::aaa:bbb:ccc:ddd]:comp=sigcomp>;expires=600000
Call-ID: adbcd3kdakd20111
Authorization: Digest username="master_private@home1.net", realm="registrar.home1.net",
     nonce="", uri="sip:registrar.home1.net", response=""                     (503)
Security-Client: ipsec-3gpp; alg=hmac-sha-1-96; spi-c=23456123; spi-s=12341233;
     port-c=2468; port-s=1357
Require: sec-agree
Proxy-Require: sec-agree
Cseq: 1 REGISTER
Supported: path
Registration-Owner: owner_uri="sip:master_public1@home1.net; gr=7ld1lfa-9avc-11la-d997-89ls";
     duration=300; issue_time=19912058821; digest=9adflk091123lsdfiedfe       (504)
Content-Length:0
```

FIG. 12

| request value | tag value of GET message | Response return value |
|---|---|---|
| IMPI | "READ_IMPI" | IMPI |
| IMPU | "READ_IMPU" | IMPU |
| HOME Network Domain Name | "READ_NETWORK_DOMAIN_NAME" | HOME Network Domain Name |
| P-CSCF Address | "READ_P-CSCF ADDRESS" | P-CSCF Address |

MASTER IMS TERMINAL FOR SHARING IMS-BASED SERVICE, SLAVE IMS TERMINAL FOR SHARING IMS-BASED SERVICE, SYSTEM FOR SHARING IMS-BASED SERVICE, AND SHARING METHOD

CROSS-REFERENCE TO RELATED APPLICATIONS

This application claims the benefit of priority of Korean Patent Application No. 10-2014-0089537 filed on Jul. 16, 2014, which is incorporated by reference in its entirety

BACKGROUND OF THE INVENTION

Field of the Invention

The present invention relates to an IP multimedia subsystem (IMS)-based terminal for sharing an IMS-based service, a slave IMS terminal for sharing an IMS-based service, a system for sharing an IMS-based service, and a sharing method, in order to allow a slave IMS terminal, which has not been registered in an IMS, to share a service provided from the IMS to a master IMS terminal which has been registered in the IMS.

Related Art

Currently, mobile communication networks provide a function allowing a user, carrying around a terminal, to be provided with a service using a communication network even while on the move. Also, recently, technologies have been developed toward a networking environment in which numerous devices are connected to a network and users may freely use such devices. This means that a user may use several terminals in the environment. In this case, the user may use a terminal shared by several people, as well as using his or her own several terminals. A smart TV, a home PC, a common notebook computer used in a conference room, and the like, are typical shared terminals.

Even though the user uses several terminals, the user may want to be provided with the same service through the several terminals. For example, the user may want to be provided with the following user experience: The user views movie through a mobile terminal, and when the user comes home, the user may want to shift the movie as is to a TV to see it through the TV. Currently, it is possible to duplicate a screen (video) displayed on a mobile terminal to a different display such as a TV such that the video, which has been viewed from the terminal, can be seamlessly viewed through the different terminal, by applying a technique such as miracast described with reference to FIG. 1. The user A may access the Internet 140 from a terminal 100 of the user A through a mobile communication network 120 and downloads video from a content server 150 of the Internet 140 in a streaming manner in real time, and thereafter, when the user (the user A) comes home and discovers a display device such as a smart TV 110, the user may duplicate the video, which is being displayed on the terminal 100 of the user A, to transmit the same to the smart TV 110 through the miracast technique, thereby being provided with the same service such as video viewing using two terminals.

However, such a technique merely relates to duplicating only a screen and video from the user terminal 100 to the different device 110, having a limitation in that it is impossible to use the shared terminal 110 as if it is his or her own terminal. For example, it is not possible for the user to directly make a call through a different terminal, rather than through the user terminal, to transmit or receive text messages, or to use a service provided by a mobile communication terminal. Also, when the smart TV 110 is connected to the Internet 140 via an internet service provider (ISP) network 130, it may be better to receive video directly from the content server 150 through the ISP network 130, rather than receiving video from the terminal 100 of the user A. This is because, in general, direct accessing the ISP network through Wi-Fi or a fixed line, rather than through the mobile communication network, is advantageous in terms of cost and speed.

In the current IP multimedia subsystem (IMS)-based mobile communication network, in order for a user to use a service provided by a mobile communication network through several terminals, all the terminals should subscribe to a mobile communication network or should remove a universal subscriber identity module (USIM) card from one device and insert the USIM to other device. Even this may not be possible if the other device does not allow installation of the USIM card. As a result, in order for the user to use several devices, the user should subscribe to the mobile communication terminal for each device, experiencing an increase in communication cost, or should experience inconvenience of interchangeably inserting the USIM card each time whenever necessary. The USIM card includes an IP multimedia service identity module (ISIM) having a function for IMS access.

SUMMARY OF THE INVENTION

The present invention provides a method for enabling a user to temporarily use a slave IP multimedia subsystem (IMS) terminal, not subscribed to an IMS mobile communication network, by using IMS registration information included in a master IMS terminal subscribed to the IMS mobile communication network.

In an aspect, an IP multimedia subsystem (IMS)-based service sharing system including an IMS, a master IMS terminal registered in the IMS, and a slave IMS terminal not registered in the IMS, wherein the master IMS terminal may transmit IMS registration information to the slave IMS terminal by using near field communication (NFC), and the slave IMS terminal may be registered in the IMS on the basis of the transmitted IMS registration information.

The IMS registration information may not include long-time password information.

The IMS registration information may include at least one among an IMPI (International Mobile Subscriber Persistent Identity), an IMPU (IP Multimedia Public identity), a Home Network Domain Name, a P-CSCF Address, and Registration Owner.

The master IMS terminal may include a first IMS UE connected to the IMS; an IP multimedia service identity module (ISIM) configured to manage the IMS registration information or perform authentication, and a first NFC module configured to establish a peer-to-peer communication channel of NFC with the slave IMS terminal.

The slave IMS terminal may include a second NFC module establishing a peer-to-peer communication channel of NFC with the first NFC module.

The master IMS terminal may further include a V-ISIM server, the slave IMS terminal may further include a V-ISIM client, and the IMS registration information may be transmitted from the V-ISIM server to the V-ISIM client.

An IMS registration information request message may be transmitted from the V-ISIM client to the V-ISIM server.

The IMS registration information request message may be a read request message with respect to at least one among the IMPI, the IMPU, the HOME Network Domain Name, and the P-CSCF Address.

In another aspect, an IP multimedia subsystem (IMS)-based service sharing method includes: (a) establishing a communication channel between a slave IMS terminal not registered in an IMS and a master IMS terminal registered in the IMS; (b) transmitting, by the master IMS terminal, an activation request message requesting the slave IMS terminal to start an operation of the IMS registration, to the slave IMS terminal; (c) transmitting, by the slave IMS terminal which has received the activation request message, an IMS registration information request message requesting the IMS registration information to the master IMS terminal; (d) transmitting, by the master IMS terminal, the IMS registration information to the slave IMS terminal; and (e) registering the slave IMS terminal in the IMS on the basis of the IMS registration information.

The communication channel may be a peer-to-peer communication channel using near field communication (NFC).

The IMS registration information may include at least one among an IMPI (International Mobile Subscriber Persistent Identity), an IMPU (IP Multimedia Public identity), a Home Network Domain Name, a P-CSCF Address, and Registration Owner.

Operation (e) may include (e-1) transmitting, by the slave IMS terminal, a first REGISTER message including the IMS registration information obtained from the master IMS terminal, to an S-CSCF included in the IMS.

The first REGISTER message may include a Registration-Owner header defined by

[Registration-Owner: owner_uri={owner_id}; duration={i_time} issue_time={1_time}; digest={digest_value} wherein, owner_id is a gruu value of the master IMS terminal, duration is an integer by seconds, which is a maximum time during which registration of the slave IMS terminal is maintained, Issue_time is a long type number in which a time at which the Registration-Owner header was created is recorded, digest is a value for verifying integrity of Registration-Owner.

Operation (e) may further include: (e-2) transmitting, by the IMS, a first NOTIFY message indicating the fact that the slave IMS terminal attempts to register in the IMS by using the IMS registration information received from the master IMS terminal, to the master IMS terminal.

The first NOTIFY message may include at least one among the Registration-Owner header included in the first REGISTER message and registration information of the slave IMS terminal in conformity with a standard (RFC 3680, RFC 5628) of a registration event package.

Operation (e) may further include: (e-3) transmitting, by the S-CSCF, a 401 Unauthorized message indicating that the slave IMS terminal should be authenticated for the IMS registration, to the slave IMS terminal; (e-4) transmitting, by the slave IMS terminal, an authentication request message including a nonce value included in the Authorization header of the 401 Unauthorized message, to the master IMS terminal; (e-5) determining, by the master IMS terminal, whether the Registration-Owner header value included in the first NOTIFY message and the header value of the IMS registration information transmitted to the slave IMS terminal in operation (d) are identical; (e-6) when the Registration-Owner header value included in the first NOTIFY message and the header value of the IMS registration information are identical, transmitting, by the master IMS terminal, authentication information including a calculated response value to the slave IMS terminal; (e-7) transmitting, by the slave IMS terminal, a second REGISTER message including an Authorization header in which the response value calculated by the master MS terminal is set, to the S-CSCF; (e-8) transmitting, by the S-CSCF, a 200 OK message as a response code indicating that the second REGISTER message has been successfully received, to the slave IMS terminal; and (e-9) transmitting, by the S-CSCF, a second NOTIFY message indicating that the slave IMS terminal has been registered in the IMS, to the master IMS terminal.

The IMS-based service sharing method may further include: (f) after the duration as a maximum time during which the registration of the slave IMS terminal is maintained has lapsed, deregistering, by the S-CSCF included in the IMS, the IMS registration of the slave IMS terminal.

Operation (f) may include (f-1) after the slave IMS terminal completes the IMS registration, recognizing that the duration has lapsed; and (f-2) transmitting, by the S-CSCF, a third NOTIFY message indicating IMS deregistration of the slave IMS terminal, to the slave IMS terminal.

The IMS-based service sharing method may further include: transmitting, by the master IMS terminal, a fourth REGISTER message requesting IMS deregistration of the slave IMS terminal, to the IMS, after the completion of the IMS registration of the slave IMS terminal; and transmitting, by the IMS terminal, a fourth NOTIFY message indicating that the IMS registration of the slave IMS terminal has been deregistered, to the slave IMS terminal.

In another aspect, a master IP multimedia subsystem (IMS) terminal for sharing a service provided from an IMS to the master IMS terminal registered in the IMS with a slave IMS terminal not registered in the IMS, may include: a first IMS UE connected to the IMS, an IP multimedia service identity module (ISIM) configured to manage the IMS registration information or authenticate the slave IMS terminal; a V-ISIM server configured to transmit the IMS registration information to the slave IMS terminal; and a first near field communication (NFC) module configured to establish a peer-to-peer communication channel of NFC with the slave IMS terminal.

In another aspect, a slave IP multimedia subsystem (IMS) terminal, not registered in an IMS, for sharing a service provided from the IMS to a master IMS terminal registered in the IMS, may include: a V-ISIM client configured to receive IMS registration information from the master IMS terminal; a second IMS UE configured to receive the IMS registration information from the V-ISIM client; and a second NFC module configured to establish a peer-to-peer communication channel of NFC with the master IMS terminal.

According to an embodiment of the present invention, since the slave IMS terminal may equally share a service provided from the IMS to the master IMS terminal, a user can use the slave IMS terminal like a master IMS terminal without a physical behavior to remove a USIM card from one terminal and insert the USIM card to a different terminal among terminals present in places to which the user moves.

Also, according to an embodiment of the present invention, since information between the master IMS terminal and the slave IMS terminal may be exchanged through an NFC communication channel, information can be simply and stably obtained.

BRIEF DESCRIPTION OF THE DRAWINGS

FIG. 4 is a view illustrating an embodiment of IMS registration information.

FIG. 5 is a view illustrating an embodiment of a first REGISTER message.

FIG. 12 is a view illustrating a table of tag values of a GET message used to obtain values of IMPU, IMPI, HOME Network Domain Name, and P-CSCF Address, and responses.

DESCRIPTION OF EXEMPLARY EMBODIMENTS

Figure 1:
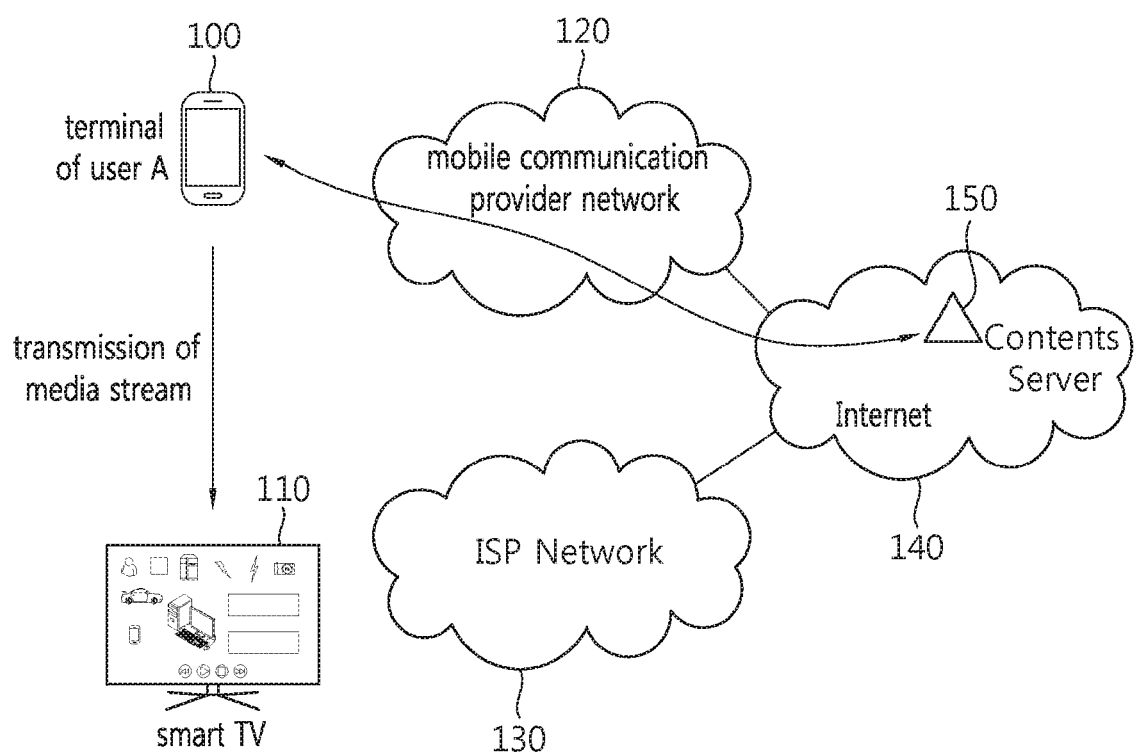
FIG. 1 is a conceptual view illustrating a miracast technique.

The present invention may be modified variably and may have various embodiments, particular examples of which will be illustrated in drawings and described in detail.

However, it is to be understood that the present invention is not limited to a specific disclosed form, but includes all modifications, equivalents, and substitutions without departing from the scope and spirit of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification, including technical and scientific terms have the same meaning as those that are understood by those skilled in the art to which the present invention pertains. It must be understood that the terms defined by the dictionary are identical with the meanings within the context of the related art, and they should not be ideally or excessively formally defined unless the context clearly dictates otherwise.

Hereinafter, preferred embodiments of the present invention will be described in detail with reference to the accompanying drawings. In describing the present invention, in order to facilitate overall understanding of the present invention, the same reference numerals indicate the same members throughout the accompanying drawings and redundant descriptions of the same components will be omitted.

Figure 2:
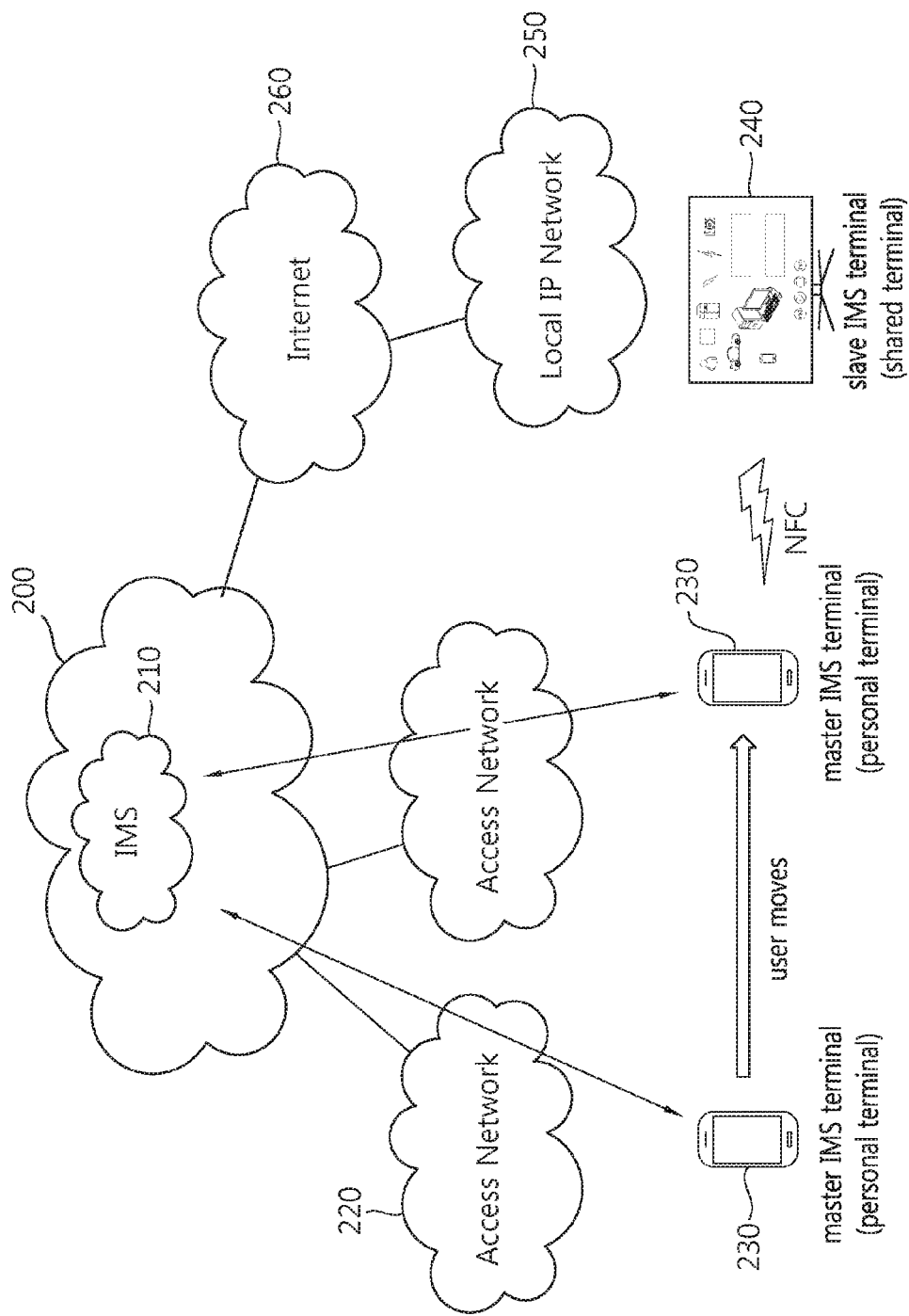
FIG. 2 is a conceptual view illustrating an IMS-based service sharing system according to an embodiment of the present invention.

FIG. 2 is a conceptual view illustrating an IP multimedia subsystem (IMS)-based service sharing system according to an embodiment of the present invention. Referring to FIG. 2, the IMS-based service sharing system according to an embodiment of the present invention may include an IP core network 200, an IMS 210, a wireless access network 220, a master IMS terminal 230, a slave IMS terminal 240, a local IP network 250, and the Internet 260.

In the present disclosure, an IMS-based service refers to a service provided from a mobile communication network provider based on an IMS, for example, content providing, message transmission and reception, call transmission and reception, any other application, and the like.

The master IMS terminal 230 is a terminal that a user mainly uses, while carrying it around. Also the master IMS terminal 230 is a personal terminal which is not shared and is registered in the IMS 210 of a mobile communication network provider. The master IMS terminal 230 may access the IP core network 200 of the mobile communication network through the wireless access network 220 and may subsequently be registered in the IMS 210. Information and functions for the master IMS terminal 230 to be registered in the IMS 210 may be installed in an IP multimedia service identity module (ISIM) of the master IMS terminal 230.

The slave IMS terminal 240 according to an embodiment of the present invention is a terminal not registered to the IMS 210 of the mobile communication network, which is a terminal that does not have mobile communication subscriber information (IMS subscriber information) and that may be shared by several people or may be personally used. For example, the slave IMS terminal 240 may be a notebook computer in a conference room, a TV in a living room of a house, and the like, and may be connected to the Internet 260 through the local IP network 250. The IMS-based service sharing system according to an embodiment of the present invention may include at least one slave IMS terminal 240.

According to an embodiment of the present invention, in order for the slave IMS terminal 240 to use an IMS-based service which is provided from the IMS 210 to the master IMS terminal 230, first, the slave IMS terminal 240 needs to be registered in the IMS 210. To this end, the slave IMS terminal 240 may obtain information required for IMS 210 registration (hereinafter, referred to as "IMS registration information") from the master IMS terminal 230.

Referring to FIG. 2, according to an embodiment of the present invention, in order for the slave IMS terminal 240 to obtain IMS registration information from the master IMS terminal 230, a short-range communication method such as near field communication (NFC) may be used. In the case of using the short-range communication method such as NFC, by simply performing an operation of bringing the master IMS terminal 230 close to the slave IMS terminal 240, the information required for registration (IMS registration information) of the slave IMS terminal 240 may be obtained from the master IMS terminal 230, and thus, the information obtaining method is simple and stable.

According to an embodiment of the present invention, when the slave IMS terminal 240 obtains the IMS registration information from the master IMS terminal 230 using NFC, user's important long-time password information stored in the master IMS terminal 230 is not transmitted to the slave IMS terminal 240. This is very important in terms of security, and if the long-time password information required for IMS registration stored in the master IMS terminal 230 is transmitted to the slave IMS terminal 240 and the slave IMS terminal 240 stores the information, it may be possible to register the slave IMS terminal 240 in the IMS 210 arbitrarily without user's permission afterwards, causing a problem of security. However, according to an embodiment of the present invention, the long-time password information is not transmitted from the master IMS terminal 230 to the slave IMS terminal 240, the security problem may be fundamentally blocked. Also, the master IMS terminal 230 may control deregistration of the slave IMS terminal 240, and thus, the slave IMS terminal 20 is prevented from arbitrarily using an IMS-based service by using information obtained from the master IMS terminal 230.

Figure 3:
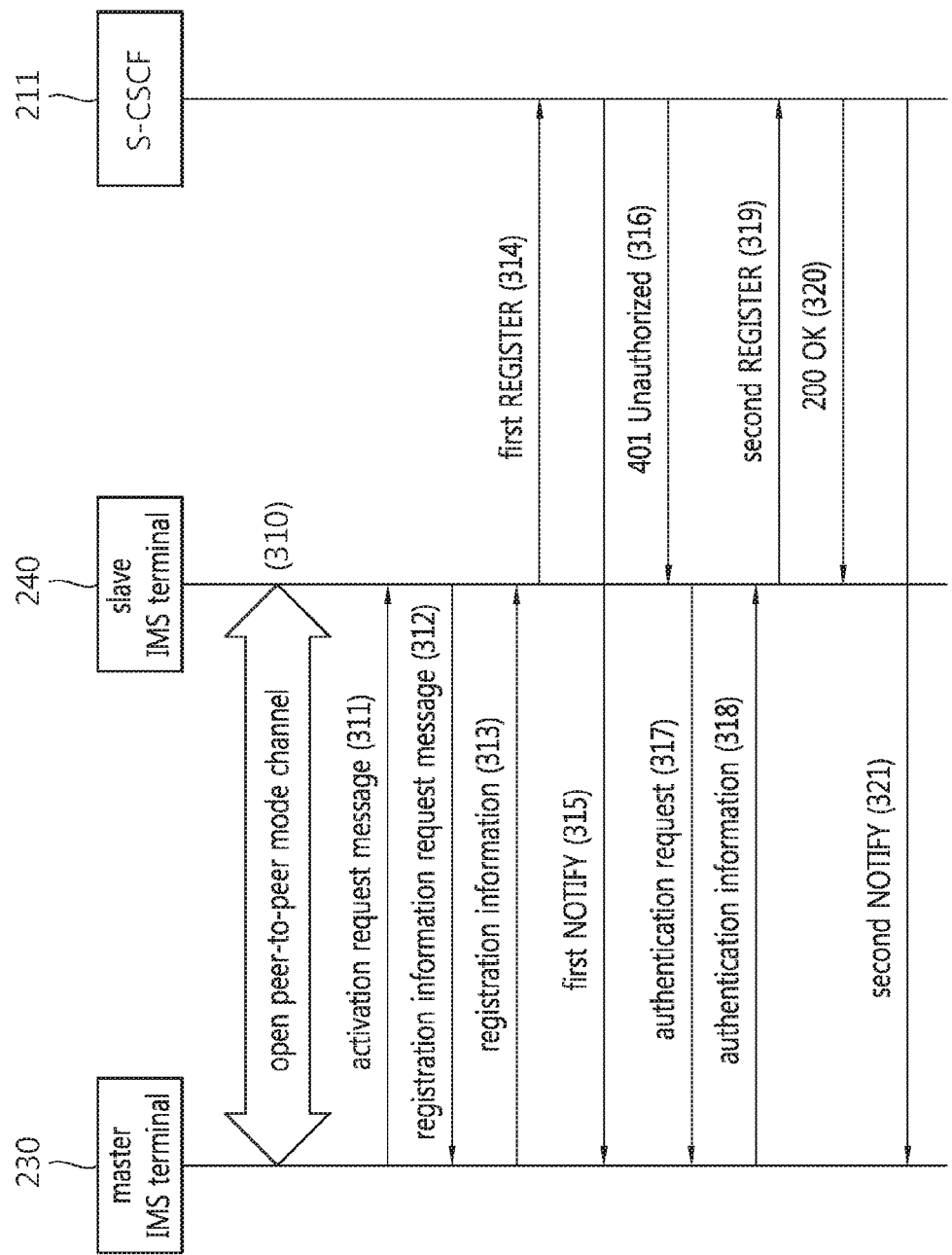
FIG. 3 is a flow chart illustrating a procedure in which a slave IMS terminal obtains IMS registration information from a master IMS terminal and registers in an IMS according to an embodiment of the present invention.

Referring to FIG. 3, a communication channel is established between the master IMS terminal 230 and the slave IMS terminal 240 in step 310. Here, the communication channel may be in a peer-to-peer mode using NFC. Thereafter, communication between the master IMS terminal 230 and the slave IMS terminal 240 may be performed using the communication channel in the peer-to-peer mode of NFC.

Thereafter, referring to FIG. 3, the master IMS terminal 230 transmits an activation request message for requesting the slave IMS terminal 240 to start an operation of IMS registration, to the slave IMS terminal 240 in step 311.

Thereafter, upon receiving the activation request message, the slave IMS terminal 240 transmits an IMS registration information request message to the master IMS terminal 230 in order to obtain IMS registration information in step 312.

Thereafter, upon receiving the IMS registration information request message, the master IMS terminal 230 transmits IMS registration information to the slave IMS terminal 240 in step 313. The IMS registration information is information and additional information stored in an ISIM 231 of the master IMS terminal 230, which may include information to be described hereinafter with reference to FIG. 4.

Referring to FIG. 4, the IMS registration information according to an embodiment of the present invention may include IMPI (International Mobile Subscriber Persistent Identity) (313a), IMPU (IP Multimedia Public identity) (313b), Home Network Domain Name (313c), P-CSCF Address (313d), and Registration Owner (313e).

IMPI 313a according to an embodiment of the present invention is an IMS subscriber identity of the user. The IMPU 313b is an identity used to inform other people, for example, a phone number. Also, home network domain name 313c is a network domain name of a mobile communication provider to which the user has subscribed. P-CSCF address 313d is an address of a P-CSCF required for the user to access the IMS 210 of the mobile communication provide network to which the user has subscribed. The IMS registration information 301a to 313b is information generated when the subscriber subscribes to the mobile communication network, which may be stored in the ISIM of the master IMS terminal. Registration owner 313e is a value required for use a terminal of the user as a master IMS terminal 230, which will be described in detail when a V-ISIM server 233 is described hereinafter.

The user's long-time password is stored in the ISIM 231 of the master IMS terminal 230. When the long-time password is transmitted from the master IMS terminal 230 to the slave IMS terminal 240, the slave IMS terminal 240 may know all the information required for IMS 210 registration, causing a problem in which the slave IMS terminal 240 may register to the IMS 210 arbitrarily. Thus, according to an embodiment of the present invention, in order to prevent the problem, the long-time password information is not transmitted from the master IMS terminal 230 to the slave IMS terminal 240.

Thereafter, referring to FIG. 3, the slave IMS terminal 240 transmits first REGISTER message to the S-CSCF 211 included in the IMS 210 in order to register the slave IMS terminal 240 in the IMS 210 in step 314. Here, the first REGISTER message includes the IMS registration information transmitted from the master IMS terminal 230 to the slave IMS terminal, 240 which will be described in detail with reference to FIG. 5 hereinafter.

In order for the first REGISTER message, transmitted from the slave IMS terminal 240, to be transmitted to the S-SCSCF 211, the first REGISTER should pass through a P-CSCF or an I-CSCF, and here, since the P-CSCF and the I-CSCF do not execute a particular function associated with the present invention, illustration of the P-CSCF and the I-CSCF is omitted in FIG. 3.

The first REGISTER message according to an embodiment of the present invention includes all of headers in conformity with IMS REGISTRATION standard procedure, and may further include the Registration-Owner header defined in the present invention.

FIG. 5 is a view illustrating an embodiment of a first REGISTER message. Referring to FIG. 5, IMPU 313b is used as values of From and To Header 501 and 502, IMPI 313a is used as a username value included in Authorization Header 503, and Home Network Domain Name 313c value is used as a realm value. The Registration-Owner header 504 is defined as follows, and the value may use the Registration Owner value 313e.

[Registration-Owner: owner_uri={owner_id}; duration={i_time} issue_time={1_time}; digest={digest_value}]

As owner_id, a gruu value of the master IMS terminal 230 is used. Duration is an integer by seconds, which is a maximum time during which registration of the slave IMS terminal 240 is maintained. That is, the duration refers to a maximum time during which the slave IMS terminal 240 remains in a registered state after the slave IMS terminal 240 completes IMS 210 registration. When the duration has lapsed, the S-CSCF 211 automatically deregisters IMS 210 registration of the slave IMS terminal 240.

Here, Issue_time is a long type number in which a time at which the Registration-Owner header is created is recorded.

Here, Digest is a value for verifying integrity of Registration-Owner. Integrity refers to that data transmitted from the master IMS terminal 230 to the slave IMS terminal 240 is identical without being modulated. Information is transmitted from the master IMS terminal 230 to the slave IMS terminal 240, and in this case, if the slave IMS terminal 240 arbitrarily changes the value of duration, or the like, a problem may arise, and thus, in order to verify the fact that such an important value has not been modulated, digest is created and transmitted. The digest is a certain value created to have a predetermined size such as 128 bit/256 bit using an encryption technique with respect to the original. Afterwards, a receiver receives the original, and generates a digest with respect to the original and compares the generated digest with a digest value attached when transmitted, thus checking whether modulation has been made. Through this method, integrity of Registration-Owner may be verified.

Thereafter, referring to FIG. 3, upon receiving the first REGISTER message, the S-CSCF 211 may transmit a first NOTIFY message indicating that the slave IMS terminal 240 attempts to register in the IMS using the IMS registration information received from the master IMS terminal 230 in step 315.

The first NOTIFY message according to an embodiment of the present invention may include the Registration-Owner header as is included in the first REGISTEER message. Also, the first NOTIFY message may include IMS registration information of the slave IMS terminal 240 in conformity with the standard (RFC 3680, RFC 5628) of a registration event package. According to the standard, a registration state of the terminal is expressed using an xml form of reginfo. The defined standard may include at least one among "registered", "created", "refreshed", "shortened", "expired", "deactivated", ""probation"", "unregistered", and "rejected" as registered events (using an event field). Here, "registering" may be used as a new event value.

Thereafter, referring to FIG. 3, the S-CSCF 211 may transmit 401 Unauthorized message indicating that the slave IMS terminal 240 should be authenticated for IMS registration, to the slave IMS terminal 240 according an IMS registration standard procedure in step 316.

Thereafter, referring to FIG. 3, upon receiving the 401 Unauthorized message, the slave IMS terminal 240 may transmit an authentication request message to the master IMS terminal 230 in step 317. The authentication request message may include a nonce value included in an Authorization header of a 401 Unauthorized response.

Thereafter, referring to FIG. 3, the master IMS terminal 230 determines whether the Registration-Owner header value included in the first NOTIFY message which was received in step 315 and the header value transmitted to the slave IMS terminal 240 in the IMS registration information transmission step 313 are identical, and when the two values are identical, the master IMS terminal 230 may transmit authentication information 318 to the slave IMS terminal 240 in step 318. Here, the authentication information may include a response value calculated in the master IMS terminal 230.

Thereafter, referring to FIG. 3, upon receiving the authentication information, the slave IMS terminal 240 may transmit a second REGISTER message including an Authorization header in which a response value received from the master IMS terminal 301 is set to the S-CSCF 303 in step 319.

Thereafter, referring to FIG. 3, the S-CSCF 211 may transmit 200 OK message as a response code indicating that the second REGISTER message has been successfully received, to the slave IMS terminal 240 in step 320, and transmit a second NOTIFY message indicating that the slave IMS terminal 240 has been registered in the IMS 210, to the master IMS terminal 230 in step 321.

As illustrated in FIG. 3, in a case in which the slave IMS terminal 240 is registered in the IMS 210, services (for example, content, call transmission and reception, message transmission reception, an application, and the like), which have been provided to the master IMS terminal 230 from the IMS-based mobile communication network, may be used as is by the slave IMS terminal 240, resolving inconvenience of removing the USIM card from the master IMS terminal 230 and inserting the USIM card into the slave IMS terminal 240.

Figure 6:
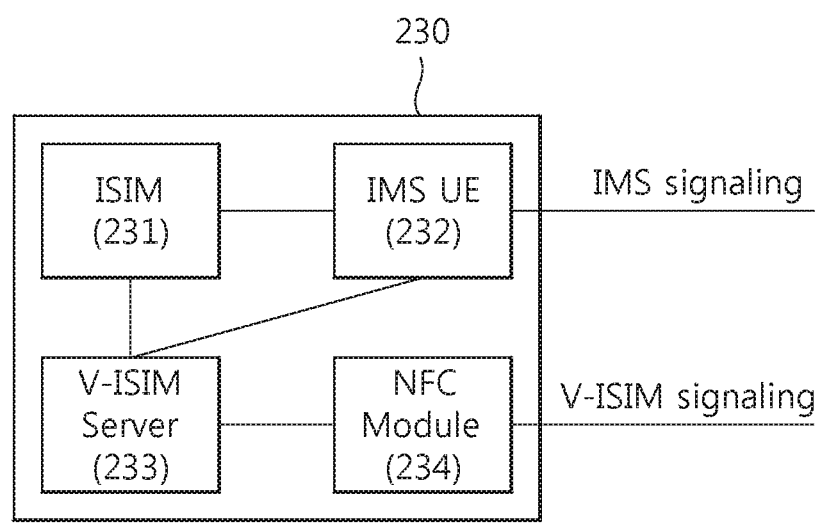
FIG. 6 is a block diagram of a master IMS terminal according to an embodiment of the present invention.

FIG. 6 is a block diagram of the master IMS terminal 230 according to an embodiment of the present invention. Referring to FIG. 6, the master IMS terminal 230 according to an embodiment of the present invention may include IP multimedia service identity module (ISIM) 231, a first IMS UE 232, a V-ISIM server 233, and a first NFC module 234.

Figure 7:
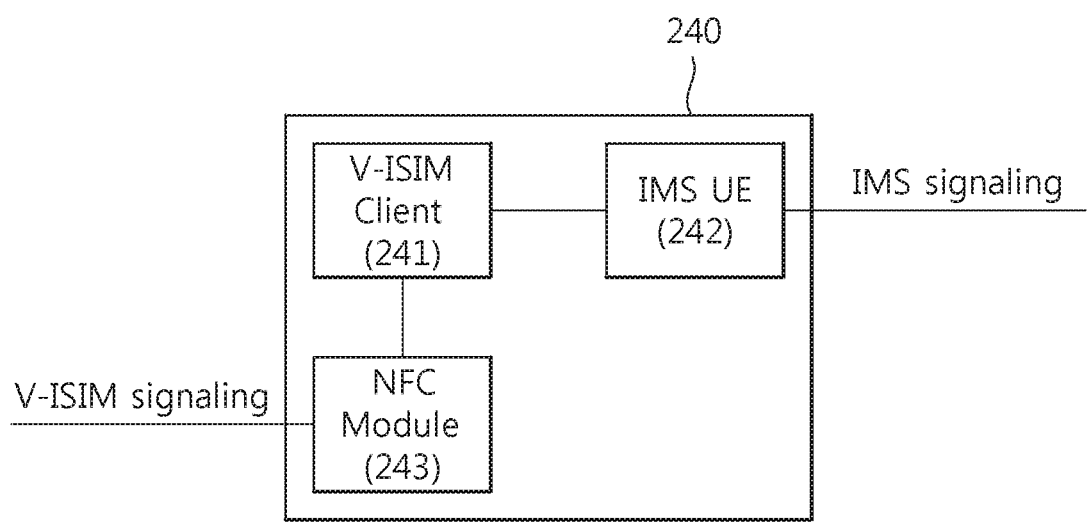
FIG. 7 is a block diagram of a slave IMS terminal according to an embodiment of the present invention.

FIG. 7 is a block diagram of the slave IMS terminal 240 according to an embodiment of the present invention. Referring to FIG. 7, the slave IMS terminal 240 according to an embodiment of the present invention may include a V-ISIM client 241, a second IMS UE 242, and a second NFC module 243.

Referring to FIG. 6, the first IMS UE 232 according to an embodiment of the present invention may be connected to the IMS 210 and provide an IMS-based service to the user.

Referring to FIG. 6, the ISIM 231 according to an embodiment of the present invention may manage IMS registration information or authenticates the slave IMS terminal 240. In general, in case of a personal terminal (master IMS terminal), in order for the IMS UE 232 to be registered to the IMS network, the IMS UE 232 may receive IMS registration information (for example, information required for IMS registration, such as IMPU, IMPI, authentication information, and the like) from the ISIM 231.

In addition, referring to FIG. 6, according to an embodiment of the present invention, the master IMS terminal 230 may further include the V-ISIM server 233 and the first NFC module 234, to allow for IMS 210 registration of the slave IMS terminal 240 and exchanging information between the slave IMS terminal 240 and the master IMS terminal 230.

According to an embodiment of the present invention, the V-ISIM server 233 may communicate with the V-ISIM client 241 provided in the slave IMS terminal 240 using a peer-to-peer communication channel between the first NFC module 234 and the second NFC module 243, and transmit IMS registration information to the V-ISIM client 241.

Also, the V-ISIM server 233 according to an embodiment of the present invention may provide the following functions.

1) Read IMPI (by v-isim client)
2) Read IMPU (by v-isim client)
3) Read HOME Network Domain Name (by v-isim client)
4) Read P-CSCF Address (by v-isim client)
5) UPDATE GRUU (by ims ue)
6) Read GRUU (by v-isim client)
7) ISSUE_OWNER_HEADER (by v-isim client)
8) VERIFY_OWNER_HEADER (by ims ue)
9) INVALIDATE_OWNER_HEADER (by ims ue)
10) AUTHENTICATE (by v-isim client)

The V-ISIM server 233 according to an embodiment of the present invention may store the IMS registration information required for IMS 210 registration including information obtained from the memory ISIM 231 in a memory thereof. For example, the IMS registration information may be IMPI, IMPU, HOME Network Domain Name, P-CSCF, Address, GRUU, or Duration.

The V-ISIM server 233 may receive IMS registration information request message transmitted from the V-ISIM client 241. Also, the V-ISIM server 233 may transmit IMS registration information to the V-ISIM client 241.

For example, the V-ISIM server 233 may receive read request message 312 regarding at least one among IMPI 313a, IMPU 313b, HOME Network Domain Name 313c, and P-CSCF Address 313d corresponding to the IMS registration information, from the V-ISIM client 241. Here, if the IMPI 313a, IMPU 313b, HOME Network Domain Name 313c, and P-CSCF Address 313d have already been stored in an internal memory of the V-ISIM server 233, the V-ISIM server 233 immediately transmit the value to the V-ISIM client 241, whereas if the IMPI 313a, IMPU 313b, HOME Network Domain Name 313c, and P-CSCF Address 313d are not present, the V-ISIM server 233 obtains the corresponding value from the ISIM 231, stores the same, and subsequently transmits the value to the V-ISIM client 241.

In order for the slave IMS terminal 240 according to an embodiment of the present invention to be registered in the IMS 210, the Registration-Owner header should be included in the first REGISTER message. The slave IMS terminal 240 may obtain the Registration-Owner header value by calling an ISSU_OWNER_HEADER function of the V-ISIM server 233. When the ISSUE_OWNER_HEADER of the V-ISIM server 233 is called, the slave IMS terminal 240 reads the GRUU value and the Duration value stored in the memory of the V-ISIM server 233 and calculates the current time t to generate a value to be used in the Registration Owner header as follows.

owner_uri={GRUU value}; duration={Duration}; issue_time={t}; digest={digest_value (Exercise) owner_uri=sip:tom@ktt.com; gr=urn:uuid: f71d1ifa-9avc-11ia-d997-89ks; duration=300; issue_time=19241038821; digest=9adflk02413j1sdfiedf digest_value is a digest value created by using MD5 or SHA-1 for {GRUU value||Duration||t} by using a secret key stored in the V-ISIM. Here, { } expresses a variable, and "||" indicates that a character string follows to be attached. The Registration_Owner header value generated in this case may be stored in the memory of the V-ISIM server 233.

Referring to FIGS. 3 and 7, the slave IMS terminal 240 transmits the first REGISTER message to the S-CSCF 211 by using the IMS registration information (for example, IMPI 313a, IMPU 313b, HOME Network Domain Name 313c, and P-CSCF Address 313d) obtained from the V-ISIM client 241, to perform registration of the slave IMS terminal 240 in step 314.

As a result, the slave IMS terminal 240 receives a 401 Unauthorized message from the S-CSCF 211 in step 316. Here, the slave IMS terminal 240 calculates a response value defined in the Authorization header and transmits a second REGISTER message to the S-CSCF 211 in step 319. In order to calculate the response value, a long-time password of the user store din the ISIM 231 is required, and thus, the slave IMS terminal 240 cannot calculate the response value by itself. Thus, in order to obtain the response value, the V-ISIM client 241 calls an AUTHENTICATE function provided by the V-ISIM server 233. Here, the V-ISIM client 241 transmits a nonce value included in the 401 Unauthorized message, as a parameter. When the V-ISIM server 233 receives the request for calling the AUTHENTICATE function, the V-ISIM server 233 verifies a flag value called isValid. When the value is true, the V-ISIM server 233 calls the AUTHENTICATE function of the ISIM 231 by using the received nonce value to obtain the response value, and transmits the obtained response value to the V-ISIM client 241. If the flag value is false, the V-ISIM sever 233 may transmit an error message to the V-ISIM client 241.

The IMS UE 232 provided in the master IMS terminal 230 according to an embodiment of the present invention may additionally perform a function to inspect validity of the Registration-Owner header required for IMS 210 registration of the slave IMS terminal 240 and a function to deregister the slave IMS terminal 240 from the IMS, in addition to the function of the IMS UE defined in the standard.

When the slave IMS terminal 240 attempts to register in the IMS 210 using the IMS registration information obtained from the master IMS terminal 230, the S-CSCF 211 may transmit the corresponding fact to the master IMS terminal 230 through the first NOTIFY message in step 315. Here, the IMS UE 232 of the master IMS terminal 230 may extract the Registration-Owner header value of the first NOTIFY message. Thereafter, the IMS UE 232 may call a VERIFY_OWNER_HEADER function of the V-ISIM server 233, and here, the IMS UE 232 may transmit the Registration-Owner header value to the V-ISIM server 233. When the received Registration-Owner header value and the Registration-Owner header value stored in the internal memory are identical and the digest value included in the Registration-Owner header does not have an error, the V-ISIM server 233 may set isValid, the internal flag, to true. The isValid flag will be used to check whether the slave IMS terminal 240 has arbitrarily modify the Registration-Owner header.

When the IMS UE 232 receives an explicit request for stopping the use of the slave IMS terminal 240, the IMS UE 232 may generate a fourth REGISTER message requesting IMS 210 deregistration of the slave IMS terminal 240 and transmit the generated fourth REGISTER message to the S-CSCF 211, and the IMS UE 232 may call an INVALIDATE_OWNER_HEADER function of the V-ISIM server 233 to prevent the slave IMS terminal 240 from being arbitrarily register again in the IMS server.

Here, in the fourth REGISTER message requesting IMS deregistration of the slave IMS terminal 240, an expires attribute value included in a Contact header is set to 0. Here, in order to designate the slave IMS terminal 240 to be deregistered, a contact address value of the slave IMS terminal 240 is set in the Contact header.

When the INVALIDATE_OWNER_HEADER function of the V-ISIM server 233 is called, the isValid value, the internal flag, is set to false. By doing that, when the slave IMS terminal 240 calls the AUTHENTICATE function of the V-ISIM server 233 for authentication, failure may be returned as a result all the time. When the IMS UE 232 generates the fourth REGISTER message for IMS 210 deregistration of the slave IMS terminal 240, a contact address of the slave IMS terminal 240 is inserted into the contact header. Here, a required contact header value may be obtained from the information of the slave IMS terminal 240 included in the first NOTIFY message 315 received when the slave IMS terminal 240 attempts registration. In this case, the NFC module 234 provides a communication channel for V-ISIM signaling.

FIG. 7 is a block diagram of the slave IMS module 240 according to an embodiment of the present invention. An existing IMS UE may obtain IMS registration information through the ISIM 2321, but the second IMS-UE 242 according to an embodiment of the present invention may obtain IMS registration information from the V-ISIM client 241.

Since the V-ISIM client 241 provides the same function as that of the ISIM 231, the function of the second IMS UE 242 for receiving various services on the basis of the IMS 211 is not different. However, by simply bringing the master IMS terminal 230 close to the slave IMS terminal 240, the user may request IMS registration of the slave IMS terminal 240. Here, there is no limitation in the method for making the master IMS terminal and the slave IMS terminal 240 contact.

V-ISIM client (241) may provide the following functions.
1) ACTIVATE (by v-isim server)
2) Read IMPI (by ims ue)
3) Read IMPU (by ims ue)
4) Read HOME Network Domain Name (by ims ue)
5) Read P-CSCF Address (by ims ue)
6) AUTHENTICATE (by ims ue)
7) ISSUE_OWNER_HEADER (by ims ue)

1) The ACTIVATE function is a function to activate the slave IMS terminal 240 by the V-ISIM server 233 to start the IMS 210 registration procedure. When the ACTIVATE function of the V-ISIM client 241 is called, a command for starting the registration procedure of the second IMS UE 242 is transmitted to the second IMS UE 242, and the second IMS UE 242 obtains the IMS registration information by calling the function provided by the V-ISIM client 241, thereby starting IMS 210 registration.

2) The Read IMPI function interworks with the V-ISIM server 233 to provide an IMPI 313a value to the IMS UE 242.

3) The Read IMPU function interworks with the V-ISIM server 233 to provide an IMPU 313b value to the IMS UE 242.

4) The Read HOME Network Domain Name function interworks with the V-ISIM server 233 to provide a HOME Network Domain Name value to the second IMS UE 242.

5) The Read P-CSCF address function interworks with the V-ISIM server 233 to provide a P-CSCF Address to the IMS UE 242.

The second IMS UE 242 generates a second REGISTER message, an IMS standard-based REGISTER command, to be transmitted to the S-CSCF 211 by using the values obtained through 1) to 5). The IMS UE 242 according to an embodiment of the present invention should additionally add the Registration-Owner header to the second REGISTER message, and here, the header value may be obtained by calling the 7) ISSUE_OWNER_HEADER function of the V-ISIM client 241.

6) The AUTHENTICATE function interworks with the V-ISIM server 233 to provide authentication information required for IMS 210 registration of the IMS UE 242. When the second IMS UE 242 first attempts to register in the S-CSCF 211, it receives a 401 Unauthorized request message. Here, a nonce value may be included in the 401 Unauthorized request message header. A response value of the Authorization header should be calculated by using the nonce value, and in this case, the second IMS UE 242 may calculate the response value by calling the AUTHENTICATE function.

The second NFC module 243 included in the slave IMS terminal 240 according to an embodiment of the present invention may provide a communication channel for signaling with the V-ISIM server 233 included in the master IMS terminal 230. FIGS. 8-11 are flow charts illustrating exchanging of information between the slave IMS terminal 240 and the master IMS terminal 230 using an NFC channel.

Figure 8:
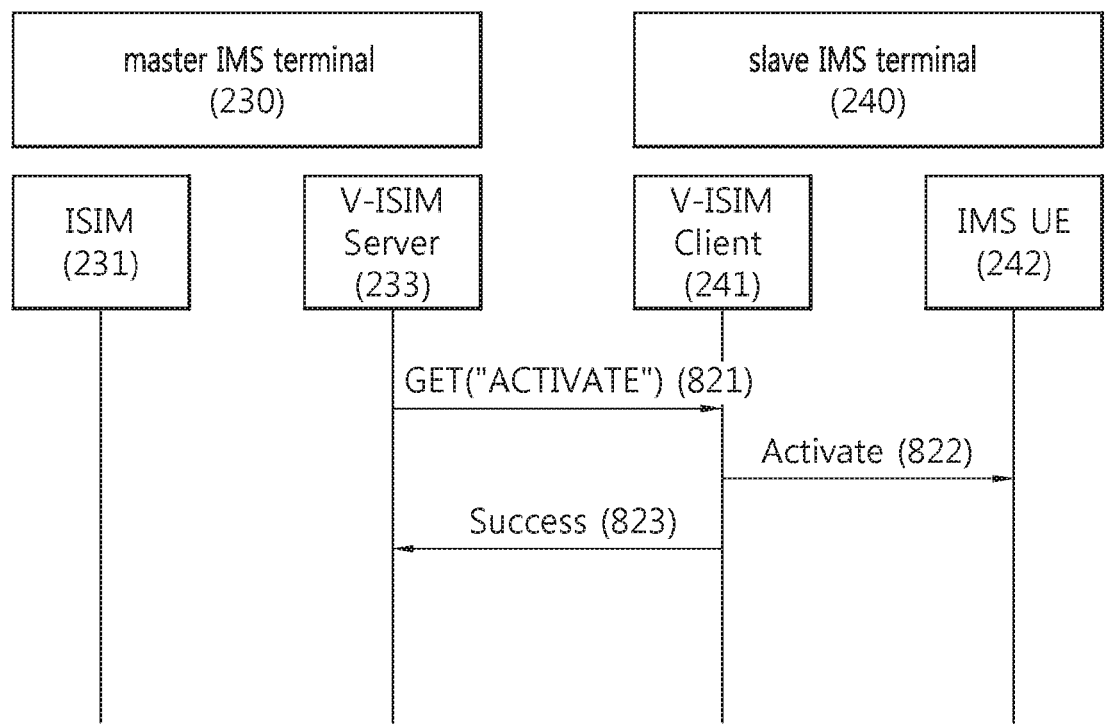
FIGS. 8 through 11 are flow charts illustrating exchanging of information between a slave IMS terminal and a master IMS terminal using a near field communication (NFC) channel according to an embodiment of the present invention.

FIG. 8 is a flow chart illustrating a procedure for requesting activation of the slave IMS terminal 240 by the master IMS terminal 230 according to an embodiment of the present invention.

The V-ISIM server 233 of the master IMS terminal 230 may activate the slave IMS terminal 240 in step 822 by reading a tag "ACTIVATE" by using a simple NDEF exchange protocol (SNEP) protocol of the V-ISIM client 241 in step 821. When the V-ISIM client 241 successfully activates the IMS UE 242, a value 1 indicating the success is returned as a response value with respect to GET, and in case of failure, a value 0 is returned in step 823.

Figure 9:
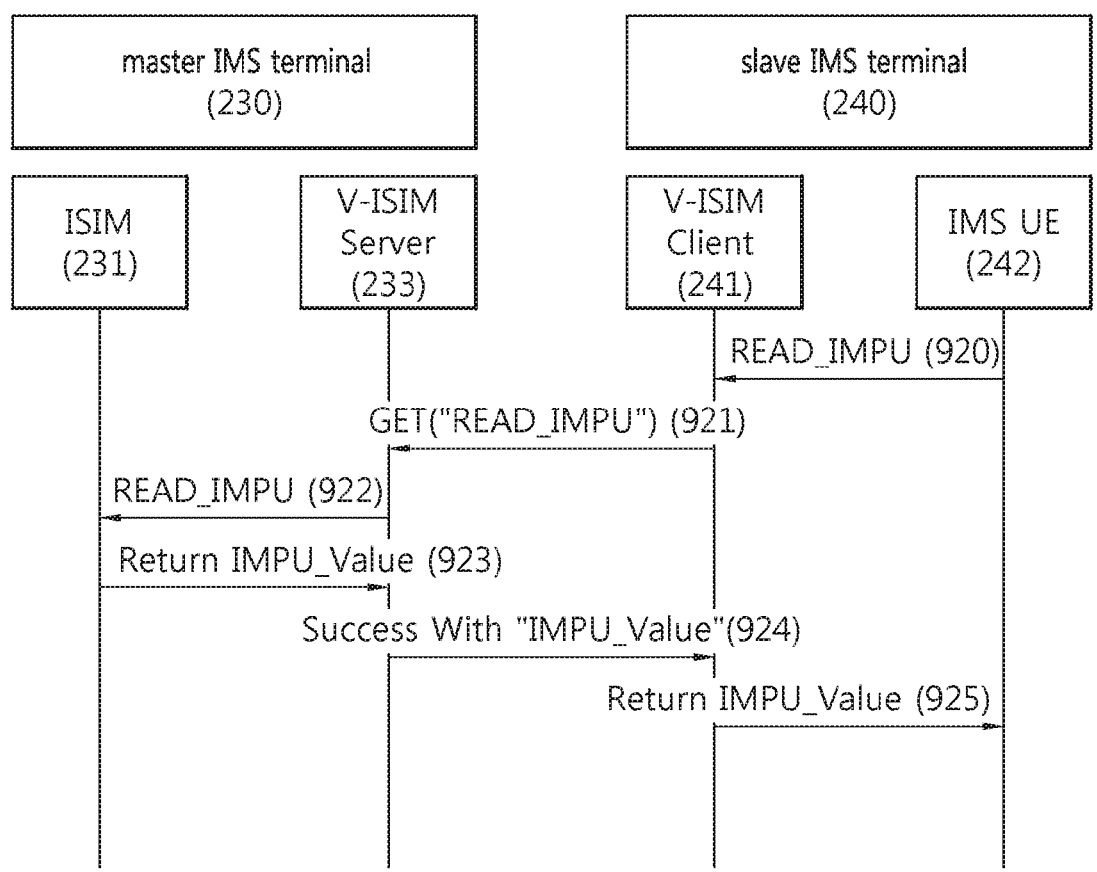

FIG. 9 is a flow chart illustrating a method for obtaining, by the slave IMS terminal 240, the IMPU value 313b as an embodiment of the IMS registration information present in the master IMS terminal 230.

The IMS UE 240 of the slave IMS terminal 240 transmits a READ_IMPU message to the V-ISIM client 241 in step 920. Thereafter, the V-ISIM client 241 transmits the READ_IMPU message to the V-ISIM server 233 in step 921. Here, the V-ISIM client 241 uses the GET command of the NEP protocol to call the READ_IMPI function, and in this case, "READ_IMPU" may be used as a tag value. Thereafter, the V-ISIM server 233 calls the READ_IMPU function, a function provided by the ISIM 231 in step 922. Thereafter, the ISIM 231 transmits an IMPU value 231b stored in the ISIM 231 to the V-ISIM server 233, and thus, the V-ISIM server 233 may read the IMPU value 231b in step 923. Thereafter, the V-ISIM server 233 may include the read IMPU value 231b in an SNEP Response message and transmits the same to the V-ISIM client 241 in step 924. Here, the Response Code may indicate Success. Thereafter, the V-ISIM client 241 may return the IMPU value 231b included in the SNEP Response to the IMS UE 242 in step 925.

FIG. 9 illustrates a case in which the IMPU 231b among the IMS registration information is used as one embodiment, and IMPI 313a, HOME Network Domain Name 313c, and P-CSCF Address 313d, as well as the IMPU 231b, may also be obtained through the foregoing method.

FIG. 12 is a view illustrating a table of tag values of a GET message used to obtain values of IMPU 313a, IMPI 313b, HOME Network Domain Name 313c, and P-CSCF Address 313d, and responses.

Figure 10:
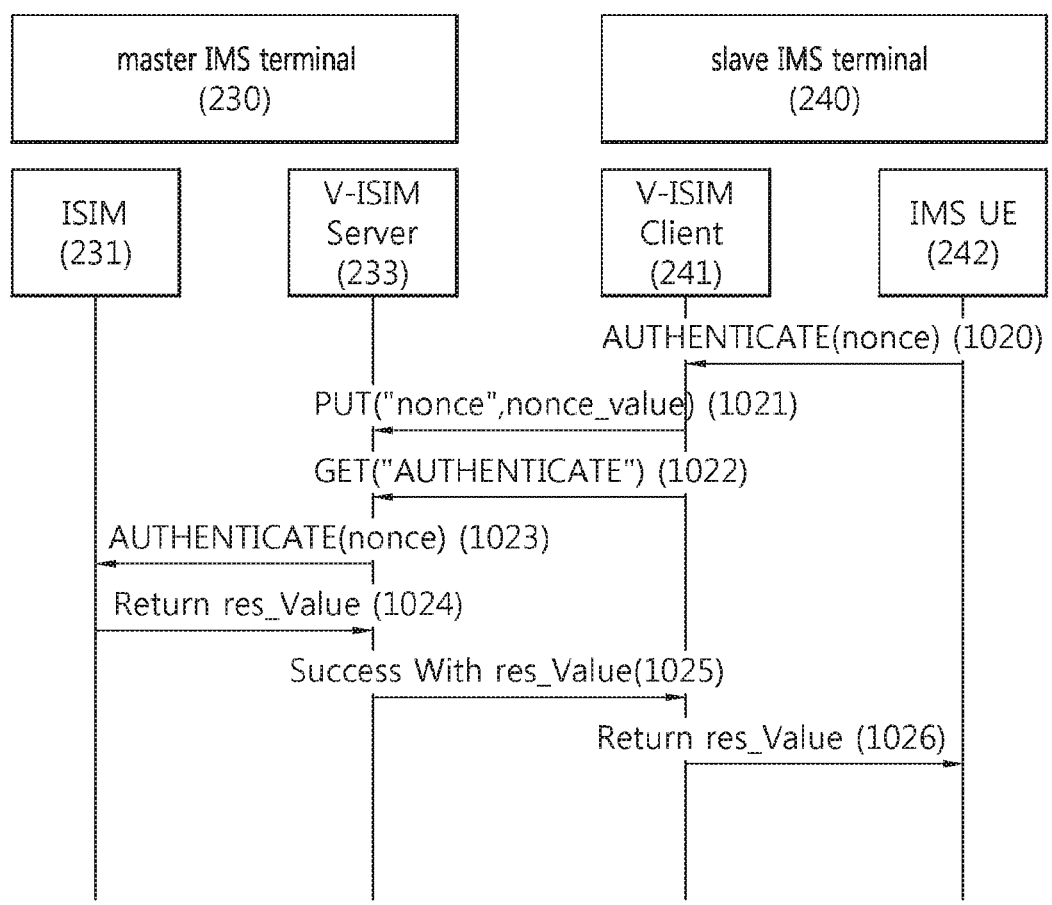

FIG. 10 is a flow chart illustrating a method for calling the AUTHENTICATE function by the slave IMS terminal 240 from the master IMS terminal 230.

Referring to FIG. 10, the second IMS UE 242 according to an embodiment of the present invention transmits an AUTHENTICATE message using a nonce value as a parameter to the V-ISIM client 241 in step 1020. Thereafter, the V-ISIM client 241 transmits the nonce value to the V-ISIM server 233 by using a SNEP PUT command in step 1021. Thereafter, the V-ISIM client 241 transmits a GET command in which a value "AUTHENTICATE" is set in a tag value to the V-ISIM server 233 in step 1022. Thereafter, the V-ISIM server 233 transmits an AUTHENTICATE message including the nonce as a parameter to the ISIM 231 in step 1023. In response, the ISIM 231 transmits a response value to the V-ISIM 233 in step 1024. Thereafter, the V-ISIM server 233 inserts the response value into Response of SNEP, and transmits the same to the V-ISIM client 241 in step 1025. Thereafter, the V-ISIM client 241 transmits the response value inserted in the Response of SNEP to the IMS UE 242 in step 1026.

Figure 11:
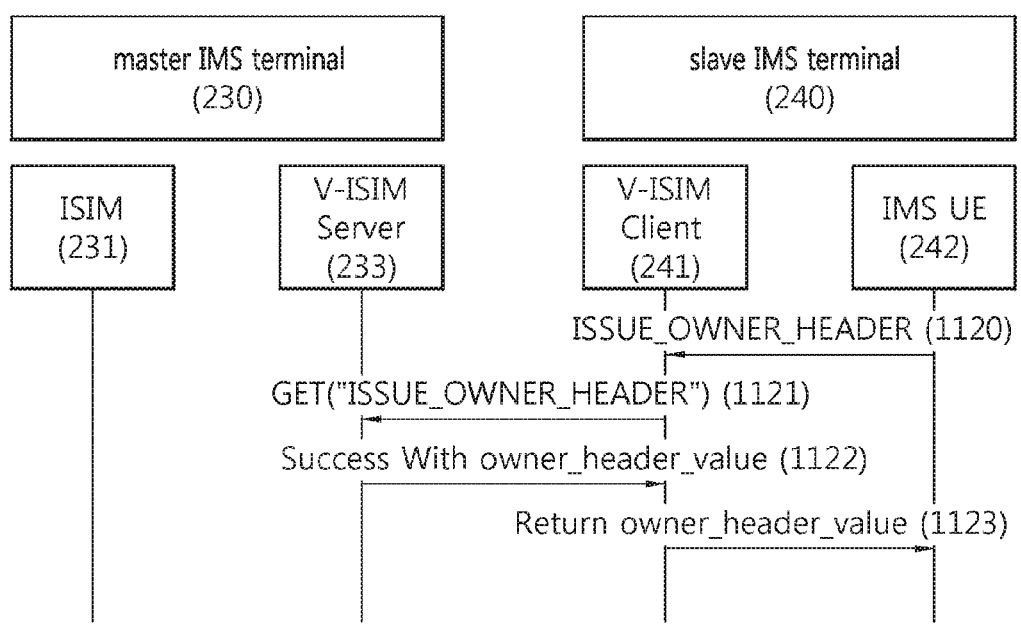

FIG. 11 is a flow chart illustrating a method for calling an ISSUE_OWNER_HEADER function by the second IMS UE 242.

The second IMS UE 242 transmits the ISSUE_OWNER_HEADER message to the V-ISIM client 241 in step 1120. Upon receiving the ISSUE_OWNER_HEADER message, the V-ISIM client 241 transmits a GET message in which the value "ISSUE_OWNER_HEADER" in a tag value to the V-ISIM server 233 in step 1121. Upon receiving the message, the V-ISIM server 233 generates a value required for the Owner-Registration header field and transmits the same to the V-ISIM client 241 in step 1122. Thereafter, the V-ISIM client 241 transmits a value required for the received Owner-Registration header field to the IMS UE 242 in step 1123.

Figure 13:
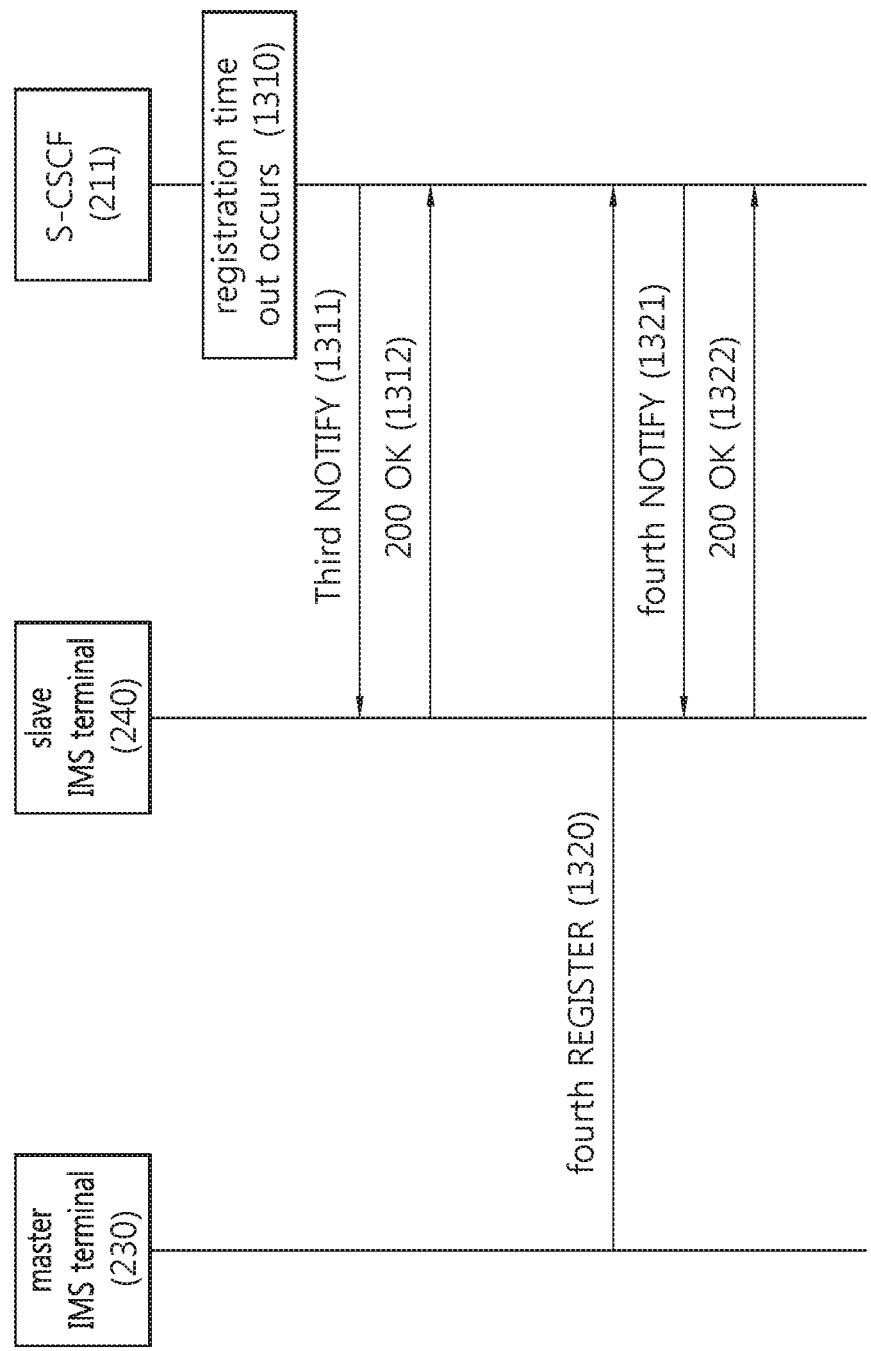
FIG. 13 is a flow chart illustrating a procedure for deregistering a slave IMS terminal.

FIG. 13 is a flow chart illustrating a procedure for deregistering the slave IMS terminal 240 according to an embodiment of the present invention.

The S-CSCF 211 according to an embodiment of the present invention may store a duration value of the Registration-Owner header included when the slave IMS terminal 240 registers in the IMS 210. The duration value is an integer by seconds, which is a maximum time during which registration of the slave IMS terminal 240 is maintained. That is, the duration refers to a maximum time during which the slave IMS terminal 240 remains in a registered state after the slave IMS terminal 240 completes IMS 210 registration. When the duration has lapsed, the S-CSCF 211 automatically deregisters IMS 210 registration of the slave IMS terminal 240.

The method for deregistering the slave IMS terminal 240 according to an embodiment of the present invention may be a method for automatically deregistering the slave IMS terminal 240 when the duration has lapsed. Referring to FIG. 13, after the slave IMS terminal 240 completes IMS registration, the duration has lapsed in step 1310. Thereafter, the S-CSCF 211 deregisters the IMS registration of the slave IMS terminal 230 and subsequently transmits a third NOTIFY message indicating the deregistration to the slave IMS terminal 240 in step 1311. Thereafter, the slave IMS terminal 240 transmits 200 OK indicating that the third NOTIFY message has been received, to the S-CSCF 211 in step 1312.

The method for deregistering the slave IMS terminal 240 according to an embodiment of the present invention may be a method for requesting, by the master IMS terminal 230, IMS deregistration of the slave IMS terminal 240 from the S-CSCF 211. Referring to FIG. 3, after the registration of the slave IMS terminal 240 is completed, the master IMS terminal 230 may explicitly transmit a fourth REGISTER message requesting IMS deregistration of the slave IMS terminal 240 to the S-CSCF 211 at a certain point in time in step 1320. Here, in the case of the fourth REGISTER message requesting the deregistration, an expires attribute value included in a Contact header is set to 0. Here, in order to designate the slave IMS terminal 230 to be deregistered, a contact address value of the slave IMS terminal 240 is set in the Contact header. Here, the contact address value may be obtained when the first NOTIFY message of FIG. 3 is received. Upon receiving the fourth REGISTER message for deregistration, the S-CSCF 211 may transmit the fourth NOTIFY message indicating that IMS registration of the slave IMS terminal 240 has been released (deregistered), to the slave IMS terminal 240 in step 1321. Thereafter, the slave IMS terminal 240 may transmit an 200 OK message indicating that the fourth REGISTER message has been successfully received, to the S-CSCF 211 in step 1322.

Referring back to FIG. 3, the S-CSCF 211 according to an embodiment of the present invention may perform the following additional functions to register the slave IMS terminal 240, as well as performing the existing S-CSCF function.

The S-CSCF 211 according to an embodiment of the present invention may receive the first REGISTER message from the slave IMS terminal 240 and recognize whether a Registration-Owner header exists. When the Registration-Owner header exists, the S-CSCF 211 transmits the first NOTIFY message to the master IMS terminal 230 to inform the master IMS terminal 230 that the slave IMS terminal 240 attempts to register by owner_uri included in the Registration-Owner header. Here, the S-CSCF 211 stores the duration value (the duration value is included in the Registration-Owner header) as a maximum registration maintaining time of the slave IMS terminal 240 in a memory, and when the duration value expires, the S-CSCF 211 may deregister the registration of the slave IMS terminal 240.

The foregoing embodiments and advantages are merely exemplary and are not to be considered as limiting the present disclosure. It will be apparent to those skilled in the art that modifications and variations can be made without departing from the spirit and scope of the invention. This description is intended to be illustrative, and not to limit the scope of the claims. Also, although an embodiment has not been described in the above disclosure, it should be extensively construed within the scope of the technical concept defined in the claims. And, various changes and modifications that fall within the scope of the claims, or equivalents of such scope are therefore intended to be embraced by the appended claims

What is claimed is:

1. An IP multimedia subsystem (IMS)-based service sharing system including an IMS, a master IMS terminal registered in the IMS, and a slave IMS terminal not registered in the IMS,
   wherein the master IMS terminal transmits IMS registration information to the slave IMS terminal by using near field communication (NFC), and the slave IMS terminal is registered in the IMS on the basis of the transmitted IMS registration information, and
   wherein the IMS registration information does not include long-time password information.

2. The IMS-based service sharing system of claim 1, wherein the IMS registration information includes at least one among an IMPI (International Mobile Subscriber Persistent Identity), an IMPU (IP Multimedia Public identity), a Home Network Domain Name, a P-CSCF Address, and Registration Owner.

3. The IMS-based service sharing system of claim 1, wherein the master IMS terminal comprises:
   a first IMS UE connected to the IMS; an IP multimedia service identity module (ISIM) configured to manage the IMS registration information or perform authentication; and
   a first NFC module configured to establish a peer-to-peer communication channel of NFC with the slave IMS terminal.

4. The IMS-based service sharing system of claim 3, wherein the slave IMS terminal includes a second NFC module establishing a peer-to-peer communication channel of NFC with the first NFC module.

5. The IMS-based service sharing system of claim 3, wherein the master IMS terminal further includes a V-ISIM server, the slave IMS terminal further includes a V-ISIM client, and the IMS registration information is transmitted from the V-ISIM server to the V-ISIM client.

6. The IMS-based service sharing system of claim 5, wherein an IMS registration information request message is transmitted from the V-ISIM client to the V-ISIM server.

7. The IMS-based service sharing system of claim 6, wherein the IMS registration information request message is a read request message with respect to at least one among the IMPI, the IMPU, the HOME Network Domain Name, and the P-CSCF Address.

8. An IP multimedia subsystem (IMS)-based service sharing method comprising:
(a) establishing a communication channel between a slave IMS terminal not registered in an IMS and a master IMS terminal registered in the IMS;
(b) transmitting, by the master IMS terminal, an activation request message requesting the slave IMS terminal to start an operation of the IMS registration, to the slave IMS terminal;
(c) transmitting, by the slave IMS terminal which has received the activation request message, an IMS registration information request message requesting the IMS registration information to the master IMS terminal;
(d) transmitting, by the master IMS terminal, the IMS registration information to the slave IMS terminal; and
(e) registering the slave IMS terminal in the IMS on the basis of the IMS registration information,
wherein the IMS registration information does not include long-time password information.

9. The IMS-based service sharing method of claim 8, wherein the IMS registration information includes at least one among an IMPI (International Mobile Subscriber Persistent Identity), an IMPU (IP Multimedia Public identity), a Home Network Domain Name, a P-CSCF Address, and Registration Owner.

10. The IMS-based service sharing method of claim 8, wherein operation (e) comprises: (e-1) transmitting, by the slave IMS terminal, a first REGISTER message including the IMS registration information obtained from the master IMS terminal, to an S-CSCF included in the IMS.

11. The IMS-based service sharing method of claim 10, wherein the first REGISTER message includes a Registration-Owner header defined by
[Registration-Owner: owner_uri={owner_id}; duration={i_time} issue_time={1_time}; digest={digest_value}
wherein, owner_id is a gruu value of the master IMS terminal, duration is an integer by seconds, which is a maximum time during which registration of the slave IMS terminal is maintained, Issue_time is a long type number in which a time at which the Registration-Owner header was created is recorded, digest is a value for verifying integrity of Registration-Owner.

12. The IMS-based service sharing method of claim 8, wherein operation (e) further comprises: (e-2) transmitting, by the IMS, a first NOTIFY message indicating the fact that the slave IMS terminal attempts to register in the IMS by using the IMS registration information received from the master IMS terminal, to the master IMS terminal.

13. The IMS-based service sharing method of claim 12, wherein the first NOTIFYmessage includes at least one among the Registration-Owner header included in the first REGISTER message and registration information of the slave IMS terminal in conformity with a standard (RFC 3680, RFC 5628) of a registration event package.

14. The IMS-based service sharing method of claim 13, wherein operation (e) further comprises:
(e-3) transmitting, by the S-CSCF, a 401 Unauthorized message indicating that the slave IMS terminal should be authenticated for the IMS registration, to the slave IMS terminal;
(e-4) transmitting, by the slave IMS terminal, an authentication request message including a nonce value included in an Authorization header of the 401 Unauthorized message, to the master IMS terminal;
(e-5) determining, by the master IMS terminal, whether the Registration-Owner header value included in the first NOTIFY message and the header value of the IMS registration information transmitted to the slave IMS terminal in operation (d) are identical;
(e-6) when the Registration-Owner header value included in the first NOTIFY message and the header value of the IMS registration information are identical, transmitting, by the master IMS terminal, authentication information including a calculated response value to the slave IMS terminal;
(e-7) transmitting, by the slave IMS terminal, a second REGISTER message including an Authorization header in which the response value calculated by the master MS terminal is set, to the S-CSCF;
(e-8) transmitting, by the S-CSCF, a 200 OK message as a response code indicating that the second REGISTER message has been successfully received, to the slave IMS terminal; and
(e-9) transmitting, by the S-CSCF, a second NOTIFY message indicating that the slave IMS terminal has been registered in the IMS, to the master IMS terminal.

15. The IMS-based service sharing method of claim 8, further comprising: (f) after the duration as a maximum time during which the registration of the slave IMS terminal is maintained has lapsed, deregistering, by the S-CSCF included in the IMS, the IMS registration of the slave IMS terminal.

16. The IMS-based service sharing method of claim 15, wherein operation (f) comprises:
(f-1) after the slave IMS terminal completes the IMS registration, recognizing that the duration has lapsed; and
(f-2) transmitting, by the S-CSCF, a third NOTIFY message indicating IMS deregistration of the slave IMS terminal, to the slave IMS terminal.

17. The IMS-based service sharing method of claim 16, further comprising:
transmitting, by the master IMS terminal, a fourth REGISTER message requesting IMS deregistration of the slave IMS terminal, to the IMS, after the completion of the IMS registration of the slave IMS terminal; and
transmitting, by the S-CSCF, a fourth NOTIFY message indicating that the IMS registration of the slave IMS terminal has been deregistered, to the slave IMS terminal.

18. A master IP multimedia subsystem (IMS) terminal for sharing a service provided from an IMS to the master IMS terminal registered in the IMS with a slave IMS terminal not registered in the IMS, the master IMS terminal comprising:
a first IMS UE connected to the IMS;
an IP multimedia service identity module (ISIM) configured to manage IMS registration information or authenticate the slave IMS terminal;
a V-ISIM server configured to transmit the IMS registration information to the slave IMS terminal; and a first near field communication (NFC) module configured to establish a peer-to-peer communication channel of NFC with the slave IMS terminal,
wherein the IMS registration information does not include long-time password information.

19. A slave IP multimedia subsystem (IMS) terminal, not registered in an IMS, for sharing a service provided from the IMS to a master IMS terminal registered in the IMS, the slave IMS terminal comprising:
  a V-ISIM client configured to receive IMS registration information from the master IMS terminal;
  a second IMS UE configured to receive the IMS registration information from the V-ISIM client; and
  a second NFC module configured to establish a peer-to-peer communication channel of NFC with the master IMS terminal,
wherein the IMS registration information does not include long-time password information.

* * * * *